(12) United States Patent
Ribarov et al.

(10) Patent No.: US 10,518,872 B2
(45) Date of Patent: Dec. 31, 2019

(54) CONTINUOUS FUEL TANK LEVEL CONTROL

(71) Applicant: Simmonds Precision Products, Inc., Vergennes, VT (US)

(72) Inventors: Lubomir A. Ribarov, West Hartford, CT (US); Richard J. Carpenter, Gales Ferry, CT (US); Russell P. Rourke, Jr., East Granby, CT (US); Charles J. Russo, Manchester, CT (US); William Luker, Glastonbury, CT (US)

(73) Assignee: SIMMONDS PRECISION PRODUCTS, INC., Vergennes, VT (US)

(*) Notice: Subject to any disclaimer, the term of this patent is extended or adjusted under 35 U.S.C. 154(b) by 336 days.

(21) Appl. No.: 15/184,201

(22) Filed: Jun. 16, 2016

(65) Prior Publication Data

US 2016/0375985 A1    Dec. 29, 2016

Related U.S. Application Data

(60) Provisional application No. 62/184,516, filed on Jun. 25, 2015.

(51) Int. Cl.
*B64C 17/10* (2006.01)
*B64D 37/04* (2006.01)

(52) U.S. Cl.
CPC .............. *B64C 17/10* (2013.01); *B64D 37/04* (2013.01)

(58) Field of Classification Search
CPC .......... B64C 17/10; B64C 37/04; B64D 37/00
See application file for complete search history.

(56) References Cited

U.S. PATENT DOCUMENTS 2,969,803 A    1/1961   Mosher
3,419,233 A *  12/1968  Wotton ................ B64D 37/14
                                                  244/135 R (Continued)

FOREIGN PATENT DOCUMENTS

WO    2008070946 A2    6/2008
WO    2014105328 A1    7/2013

OTHER PUBLICATIONS

"Aircraft Fuel Systems", Langton, Roy; Clark, Chuck; Hewitt, Martin; and Richards, Lonnie: Wiley Publication, 2009.*

(Continued)

*Primary Examiner* — Philip J Bonzell
(74) *Attorney, Agent, or Firm* — Cantor Colburn LLP

(57) ABSTRACT

A method of aircraft fuel distribution includes selecting a longitudinal center of gravity and predicting a rate of change of the center of gravity during flight. Fuel is located in a tail fin tank of a vertical tail fin of the aircraft, and is transferred from the tail fin tank forward at a predetermined transfer rate to counteract the predicted rate of change thereby maintaining the selected center of gravity. An aircraft fuel distribution system includes a center main fuel tank, a tail fin tank and a tail fin fuel pump to pump fuel between the tail fin tank and the center main fuel tank. An electronic controller operates the tail fin fuel pump such that fuel is flowed between the tail fin tank and the center main fuel tank at a predetermined transfer rate to maintain automatically an optimal position of a longitudinal center of gravity of the aircraft.

16 Claims, 3 Drawing Sheets

(56) References Cited

U.S. PATENT DOCUMENTS

| | | | |
|---|---|---|---|
| 4,622,639 A | 11/1986 | Adelson et al. | |
| 5,321,945 A | 6/1994 | Bell | |
| 6,913,228 B2 | 7/2005 | Lee et al. | |
| 6,997,415 B2 | 2/2006 | Wozniak et al. | |
| 7,337,795 B2 | 3/2008 | Johnson et al. | |
| 7,591,277 B2 | 9/2009 | Johnson et al. | |
| 7,594,277 B2 | 9/2009 | Zhang et al. | |
| 7,648,103 B2 * | 1/2010 | Barbosa | B64C 17/10 137/587 |
| 8,226,040 B2 | 7/2012 | Neto | |
| 8,548,721 B2 | 10/2013 | Aoai et al. | |
| 8,814,096 B2 | 8/2014 | Spottiswoode et al. | |
| 8,851,424 B2 * | 10/2014 | Barbosa | B64C 17/10 244/135 C |
| 8,888,046 B2 | 11/2014 | Cremers | |
| 9,517,836 B2 * | 12/2016 | Sjungargard | B64C 17/10 |
| 2005/0051666 A1 | 3/2005 | Lee et al. | |
| 2009/0050743 A1 * | 2/2009 | Barbosa | B64C 17/10 244/135 A |
| 2011/0226906 A1 | 9/2011 | Spottiswoode et al. | |
| 2011/0231056 A1 | 9/2011 | Sjungargard et al. | |

OTHER PUBLICATIONS

European Search Report and Communication; Application No. 16176290.1-1754; dated Sep. 27, 2016; 8 pages.

* cited by examiner

CONTINUOUS FUEL TANK LEVEL CONTROL

CROSS-REFERENCE TO RELATED APPLICATIONS

This application claims the benefit of U.S. Provisional Application Ser. No. 62/184,516, entitled "CONTINUOUS FUEL TANK LEVEL CONTROL", filed Jun. 25, 2015, under 35 U.S.C. § 119(e), and which is incorporated herein by reference in its entirety.

BACKGROUND

The subject matter disclosed herein relates to aircraft. More particularly, the present disclosure relates to management of fuel flow from and between aircraft fuel tanks.

Fuel costs are a large operating expense for aircraft operators such as airlines, so operators are constantly making efforts to reduce such costs. One way to potentially reduce an aircraft's fuel consumption is to manage the aircraft's longitudinal axial (i.e., "pitch" axis) center of gravity (CG) during long range flights.

It is known that during cruise flight conditions positioning the aircraft CG slightly aft along the aircraft's longitudinal axis can reduce the aircraft's drag, thus reducing fuel consumption. With the longitudinal CG positioned slightly aft, negative effects of tail plane lift are reduced, leading to a reduced overall angle of attack (OAA) of the aircraft due to a reduced moment arm impacted by diminished tail plane lift. The lower OAA reduces the aircraft's parasitic drag, which consequentially saves fuel. Control of the aircraft's CG along its yaw and pitch axes is also accomplished by the correct fuel transfer between the aircraft's various fuel tanks. It is however, the aircraft's pitch axis CG that has the largest effect on the aircraft's OAA.

Many factors are accounted for in calculating of the desired longitudinal CG during cruise flight, such as number and distribution of passengers and crew, and weight and onboard location of items such as freight, food, potable water, etc. All of these items together with the aircraft's unfueled, or "dry", weight define the aircraft's zero fuel weight (ZFW). Adding the fuel on board (FOB) necessary for the flight brings the aircraft to its maximum take-off weight (MTOW). While the aircraft's ZFW weight remains relatively constant throughout the flight, the MTOW continuously decreases as fuel is consumed by the engines, thus making the aircraft's longitudinal CG dynamic. Fuel usage typically results in the longitudinal CG moving further aft to an undesired location.

Referring to FIG. 1 typical long range aircraft 200 carry their FOB in center main tanks 202, typically the largest tanks of the aircraft 200. Fuel is also carried in wing tanks, such as wing tanks 204, 206, 208, and flows out via collector cells 214 located in the fuel tanks which are directly supplying fuel to the engines. In this embodiment, there are four (4) engines in total (i.e. two (2) engines per wing as shown in FIG. 2). In some aircraft, additional fuel may be carried in tail plane tanks 210 and/or vertical tail fin tanks 212. Fuel is typically first consumed from the center main tanks 202, then from the wing tanks 204, 206, 208, beginning with inner wing tanks 204. Fuel in the outer wing tanks 208 is typically the last to be consumed, as the weight of the fuel in those tanks counteracts the increased wing lift force acting on the wing tips, thus reducing structural stresses on the wing tips during cruise flight conditions. Fuel surge tanks 216 in the wing tips of the aircraft are used to allow for any fuel volume change/spill-over from the outer wing tanks 208. Such fuel volume change may result (but it is not limited to) changes in fuel temperature and pressure, changes in ambient air temperature and pressure, changes in aircraft flight attitude (i.e. banking during turns, pitching up/down during take-off/landings, vibrations due to turbulence, etc.), etc.

Fuel is often transferred between the center main tanks 202 and the wing tanks 204, 206, 208 to maintain lateral trim, or balance, of the aircraft 200 as fuel is consumed. Also, fuel is transferred back and forth between the center main tanks 202 and the tail plane tanks 210 to affect the CG of the aircraft 200. Transferring fuel forward to the center main tanks 202 moves the CG forward, while transferring fuel rearward to the tail plane tanks 210 moves the CG rearward. This fuel transfer is typically performed manually by a member of the flight deck crew, often one dedicated to performing the fuel transfers. As the CG moves during flight due to fuel consumption, the flight deck crewmember turns on pumps to transfer fuel, then turns the pumps off when the CG is moved to a desired location. This process is repeated periodically throughout the flight, resulting in imprecise, stepwise changes in the CG throughout the flight, relative to a mean aerodynamic chord (MAC) of the aircraft.

BRIEF SUMMARY

In one embodiment, a method of fuel distribution in an aircraft includes selecting a desired longitudinal center of gravity of an aircraft and determining a predicted rate of change of the center of gravity location during flight operation of the aircraft. A volume of fuel is located in a tail fin tank of a vertical tail fin of the aircraft, and the fuel is transferred from the tail fin tank forward along a longitudinal axis of the aircraft at a predetermined transfer rate to counteract the predicted rate of change of the center of gravity location thereby maintaining the center of gravity in the selected position.

Alternatively or additionally, in this or other embodiments fuel is transferred from one or more tail plane tanks disposed at horizontal tail planes of the aircraft to the tail fin tank, and the fuel is transferred from the tail fin tank forward along the longitudinal axis at the predetermined rate.

Alternatively or additionally, in this or other embodiments the fuel is transferred forward along the aircraft's longitudinal axis to a center main fuel tank of the aircraft.

Alternatively or additionally, in this or other embodiments the fuel is pumped from the center main fuel tank to one or more engines of the aircraft.

Alternatively or additionally, in this or other embodiments the predetermined transfer rate is based on an anticipated fuel consumption rate of the aircraft.

Additionally or alternatively, in this or other embodiments the anticipated fuel consumption rate is determined by sensors in an aircraft fuel quantity indication system.

Additionally or alternatively, in this or other embodiments the anticipated fuel consumption rate is a predetermined fuel consumption rate based on the mapped flight course.

In another embodiment, an internal fuel distribution system for an aircraft includes a center main fuel tank located at a fuselage of an aircraft, a tail fin fuel tank located at a vertical tail fin of the aircraft and a tail fin fuel pump to pump fuel between the tail fin fuel tank and the center main fuel tank along a longitudinal axis of the aircraft. A controller is operably connected to the tail fin fuel pump to control operation of the tail fin fuel pump such that fuel is flowed between the tail fin fuel tank and the center main fuel tank at a predetermined transfer rate to maintain a selected position of a longitudinal center of gravity of the aircraft.

Additionally or alternatively, in this or other embodiments two or more tail plane fuel tanks are positioned at one of more horizontal tail planes of the aircraft in selective fluid communication with the tail fin fuel tank.

Alternatively or additionally, in this or other embodiments a three-way valve operably connects the two or more tail plane fuel tanks and the tail fin fuel tank to control fuel flow between the tail plane fuel tanks and the tail fin fuel tank.

Alternatively or additionally, in this or other embodiments a tail plane fuel pump is positioned at a tail plane fuel tank to pump fuel flow between the tail plane fuel tank and the tail fin fuel tank.

Alternatively or additionally, in this or other embodiments the tail fin fuel pump is configured to pump fuel forward along the longitudinal axis of the aircraft from the tail fin fuel tank to the center main fuel tank.

Alternatively or additionally, in this or other embodiments the predetermined transfer rate is based on an anticipated fuel consumption rate of the aircraft.

Additionally or alternatively, in this or other embodiments the anticipated fuel consumption rate is determined by sensors in an aircraft fuel quantity indication system.

Additionally or alternatively, in this or other embodiments the anticipated fuel consumption rate is a predetermined fuel consumption rate based on the mapped flight course.

In yet another embodiment, an aircraft includes a fuselage extending along a longitudinal axis of the aircraft, two wings extending laterally from the fuselage, a tail fin extending substantially vertically from a tail portion of the fuselage, one or more engines operably connected to the aircraft to provide thrust for the aircraft, and a fuel distribution system to provide fuel to the one or more engines. The fuel distribution system includes a center main fuel tank located at the fuselage, a tail fin fuel tank located at the tail fin, and a tail fin fuel pump to pump fuel between the tail fin fuel tank and the center main fuel tank along the longitudinal axis of the aircraft. An electronic controller is operably connected to the tail fin fuel pump to automatically control operation of the tail fin fuel pump such that fuel is flowed between the tail fin fuel tank and the center main fuel tank at a predetermined transfer rate to maintain a selected optimal position of a longitudinal center of gravity of the aircraft.

Alternatively or additionally, in this or other embodiments two or more tail plane fuel tanks are located at one of more horizontal tail planes of the aircraft in selective fluid communication with the tail fin fuel tank.

Alternatively or additionally, in this or other embodiments a three-way valve operably connects the two or more tail plane fuel tanks and the tail fin fuel tank to control fuel flow between the tail plane fuel tanks and the tail fin fuel tank.

Alternatively or additionally, in this or other embodiments a tail plane fuel pump is located at a tail plane fuel tank to pump fuel flow between the tail plane fuel tank and the tail fin fuel tank.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
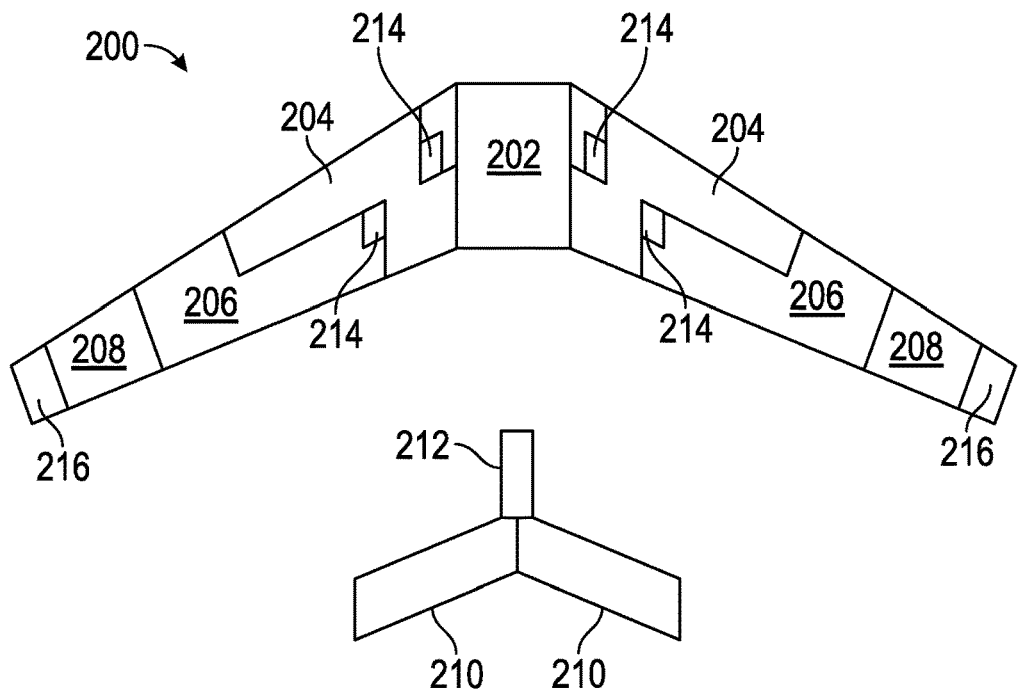
FIG. 1 is a schematic view of a typical prior art fuel distribution system for an aircraft.
Figure 2:
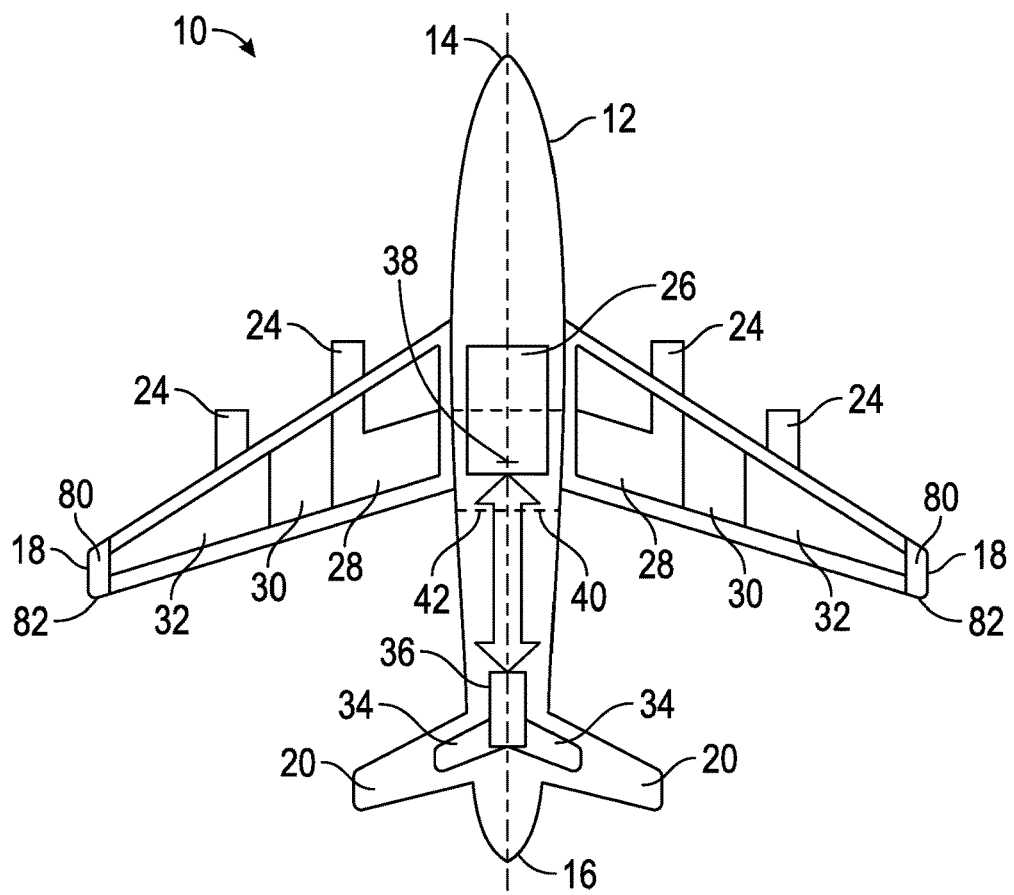
FIG. 2 is a plan view of an embodiment of an aircraft.
Figure 3:
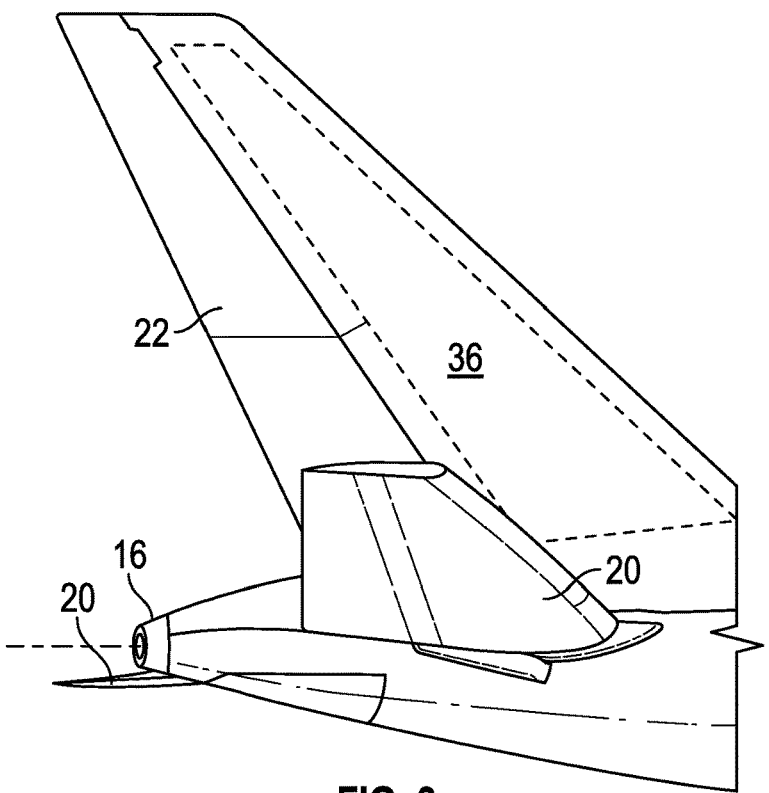
FIG. 3 is an elevation view of a tail portion of an embodiment of an aircraft.

Shown in FIG. 2 is a plan view of an embodiment of an aircraft 10. The aircraft 10 includes a fuselage 12 extending axially from nose 14 to tail 16 of the aircraft 10, and wings 18 extending laterally from the fuselage 12. The aircraft 10 further includes a tail section including laterally-extending tail planes 20, and a vertically-extending tail fin 22, shown in the side view of FIG. 3. As shown in FIG. 3, tail fin tank 36 may occupy any space inside tail fin 22 as long as said tail fin tank 36 does not interfere with any internal tail fin structures. Such structures can be moving (e.g., rudder, trim tabs, etc.) or stationary (e.g., structural support spars, ribs, etc.).

Referring again to FIG. 2, the aircraft 10 utilizes engines 24 to provide thrust, which are supplied with fuel from a plurality of fuel tanks onboard the aircraft 10. The fuel tanks include a center main tank 26, a plurality of wing tanks 28, 30, 32, surge fuel tanks 80 located at wing tips 82, tail plane tanks 34 and a tail fin tank 36. It is to be appreciated that the arrangement of fuel tanks shown is merely one configuration and one skilled in the art will recognize that other arrangements, such as different quantities and geometries of wing tanks or center main tanks or tail plane tanks or tail fin tanks are contemplated within the scope of the present disclosure.

Maintaining a center of gravity (CG) 38 of the aircraft 10 within a selected range, shown schematically with dashed lines at 40, is desired to reduce parasitic drag of the tail planes 20 which contributes to reducing fuel consumption of the aircraft. Exceeding an aft CG limit 42, however, may jeopardize axial (i.e., "pitch" axis) balance of the aircraft 10 leading to operational instabilities.

During flight, fuel is consumed initially from the center main tank 26, then from the wing tanks 28, 30, 32. As fuel is consumed from the center main tank 26, the axial CG 38 slowly drifts rearward. To compensate for consumption of the fuel from the center main tank 26, fuel is transferred from the tail fin tank 36 at a predetermined rate, controlled by a closed-loop 78 automatic electronic controller 70 (both shown in FIG. 5). The rate may be set utilizing projected fuel consumption rates for the flight and/or other factors, which may include (but are not limited to); flight path heading corrections (i.e., due to ambient atmospheric weather changes en-route to the final destination); seasonal head-/tail-/cross-winds, unexpected flight path diversions (i.e., due to unscheduled stops en-route to the final destination; a crash; a bird strike; terrorist activities; etc.); flight path diversions/landings due to on-board medical emergencies; extended holding fuel (i.e. to "circle" above an alternate airport near the final destination until a landing slot is found); ETOPS rules (if aircraft is with two engines flying over oceans); fuel tankering (i.e. carrying additional fuel from an airport with lower fuel prices); etc. For example, the rate may be determined directly by sensors in the aircraft fuel quantity indication system, or it could be a predetermined fuel consumption rate based on the mapped flight course, or it could be derived from a periodic "check point" in the flight software that compares an anticipated/projected fuel consumption rate to an actual fuel consumption rate.

Figure 4:
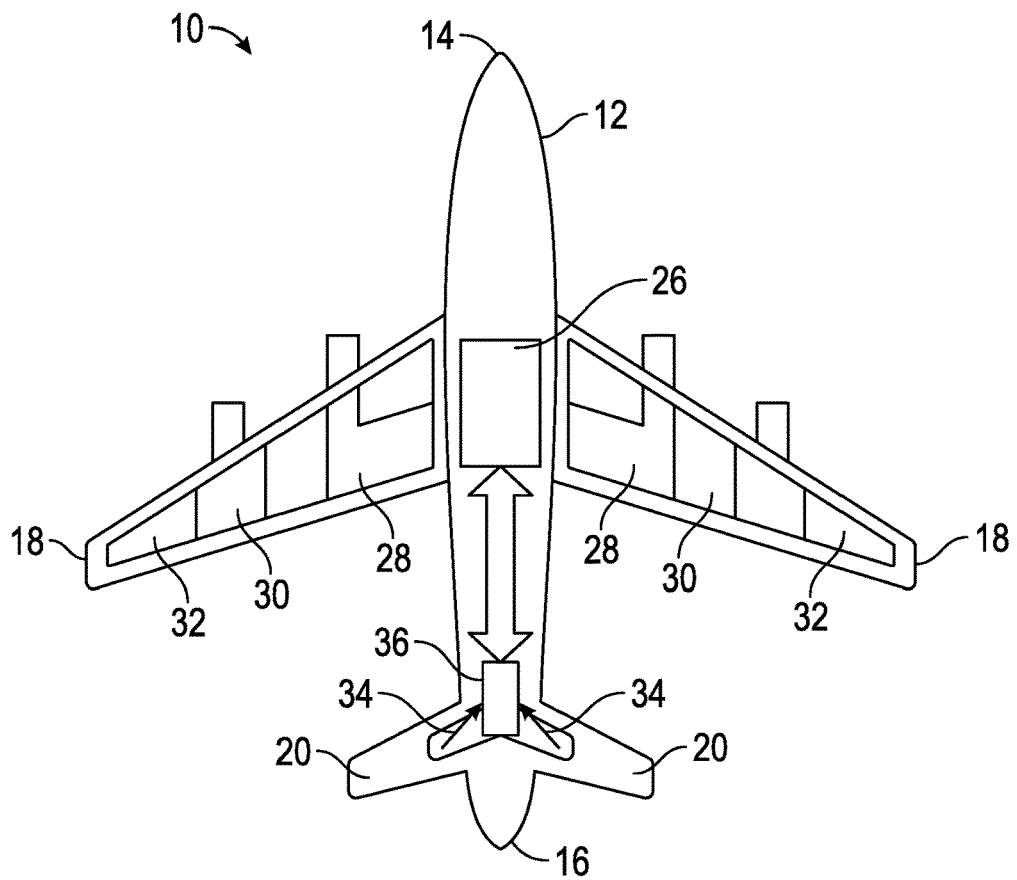
FIG. 4 is a plan view of another embodiment of an aircraft.

Transferring fuel from the tail fin tank 36 at this predetermined rate prevents the CG 38 from moving beyond the aft CG limit 42. Referring to FIG. 4, if once fuel from the tail fin tank 36 is exhausted, additional fuel transfer is needed to prevent the CG 38 (shown in FIG. 2) moving beyond the aft CG limit 42 (shown in FIG. 2), fuel may be transferred from the tail plane tanks 34 to the tail fin tank 36, and then, subsequently, forward to the center main tank 26. Further, since fuel is only transferred from the tail fin tank 36 to the center main tank 26, no change in lateral (i.e., "roll" axis) stability of the aircraft 10 is anticipated.

Since it is unlikely to be necessary to transfer fuel rearward from the center main tank 26 to the tail fin tank 36, a fuel transfer system can be greatly simplified. The system utilizes a weight detection and prediction algorithm that only needs to monitor the aircraft's longitudinal CG location. Furthermore, the additional fuel present in the tail fin tank 36 allows the CG 38 (shown in FIG. 2) to be located closer to an optimal aft position, without exceeding the aft CG limit 42 (shown in FIG. 2), even at the beginning of the flight when the aircraft 10 is at maximum MTOW to therefore reduce fuel transfers from the tail fin tank 36 to the center main tank 26 during the flight.

Figure 5:
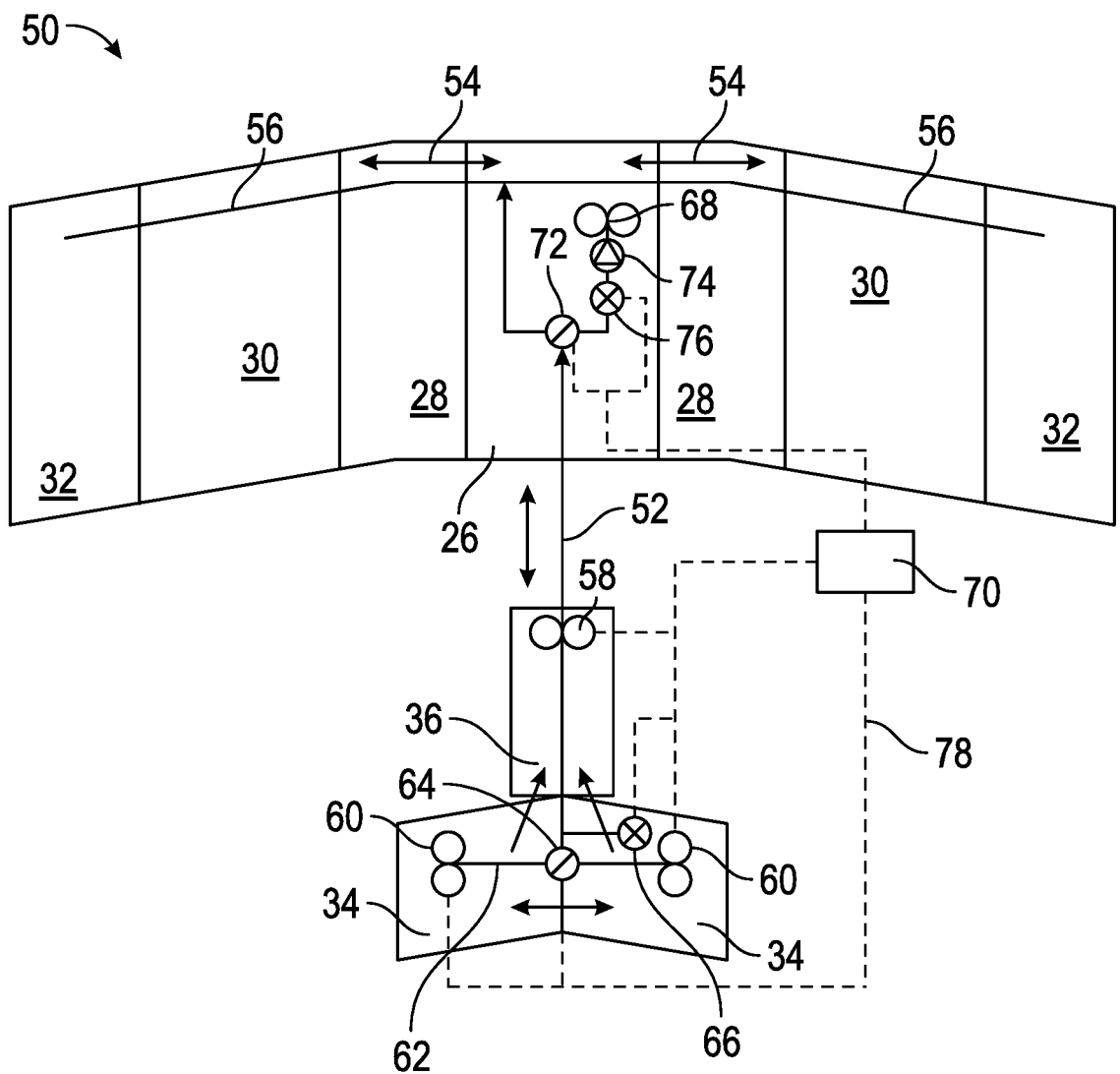
FIG. 5 is a schematic view of an embodiment of a fuel distribution system for an aircraft.

A schematic view of an embodiment of a fuel distribution and transfer system 50 is shown in FIG. 5. The schematic shows the center main fuel tanks 26, wing tanks 28, 30, 32, tail plane tanks 34 and the tail fin tank 36. A longitudinal fuel transfer line 52 connects the tail fin tank 36 and the center main fuel tanks 26, while lateral fuel transfer lines 54 connect the wing tanks 28, 30, 32 to the center main fuel tanks 26, and engine fuel supply lines 56 distribute fuel from the center main fuel tanks 26 to the engines 24 (shown in FIG. 2). A tail fin fuel pump 58 is located at the tail fin tank 36 to pump fuel between the tail fin tank 36 and the center main tanks 26 along the longitudinal fuel transfer line 52. In case of failure of tail fin fuel pump 58, the fuel from tail fin tank 36 can be drained due to the action of gravitational forces during a normal flight attitude. Subsequently, tail planes fuel pumps 60 can then further pump the fuel from tail fin tank 36 to the center main tanks 26 along the longitudinal fuel transfer line 52. Tail plane fuel pumps 60 are located at each of the tail plane tanks 34 to pump fuel from the tail plane tanks 34 to the tail fin tank 36 and, subsequently, to the center main tanks 26 via the longitudinal fuel transfer line 52, if needed. This fuel flow is along tail plane fuel transfer lines 62 and along longitudinal fuel transfer line 52. Unlimited fuel transfer between the tail plane tanks 34 in the lateral direction along fuel transfer line 62 is allowed and accommodated by actuation of the tail pane fuel pumps 60.

The tail plane fuel transfer lines 62 are connected to the longitudinal fuel transfer line 52 via a three way valve 64 that allows fuel from one or another of the tail plane fuel lines 62 to flow into the vertical tail fin tank 36, and may also be utilized to flow fuel between the tail plane tanks 34 to maintain lateral ("roll" axis) balance at the tail planes 20. A fuel shut-off valve 66 is further provided between the tail plane tanks 34 and the tail fin tank 36, for example, between the three way fuel valve 64 and the tail fin fuel pump 58, to control the flow of fuel between the tail plane tanks 34 and the tail fin tank 36. When fuel flow is desired or necessary from the tail plane tanks 34 to the tail fin tank 36, the fuel shut-off valve 66 is opened. Under other conditions, the fuel shut-off valve 66 remains closed. In addition, the three-way fuel valve 64 proportions the same amount of fuel flow from each tail plane fuel tank 34. Thus, any potential lateral instability due to fuel weight shifting from, say, the port ("i.e., "left" in ALF (Aft-Looking-Forward) position) tail plane fuel tank 34 to the starboard (i.e., "right" in ALF position) plane fuel tank 34 is eliminated.

The center main tank 26 includes a main fuel pump 68 that pumps fuel from the center main tanks 26 through the engine fuel supply lines 56 to the engines 24 (shown in FIG. 2). A main fuel three-way valve 72 is located at the center main tanks 26 and connects the longitudinal fuel transfer line 52 to the engine fuel supply lines 56 and to the center main tanks 26. The main fuel three-way valve 72 allows fuel to be selectively directed from the longitudinal fuel transfer line 52 and/or the center main tanks 26 to the engine fuel supply lines 56. A main fuel check valve 74 and a main fuel shut off valve 76 are located along the fuel pathway between the main fuel pump 68 and the main fuel three-way valve 72 to control fuel flow between the center main tanks 26 and the main fuel three-way valve 72.

The systems and methods described herein provide a simple, accurate reliable and lightweight, cost effective solution for fuel flow control on an aircraft. The fuel transfers are managed such that the aircraft longitudinal ("pitch" axis) CG is maintained within a selected range to provide a selected optimal OAA thereby reducing fuel consumption of the aircraft. Furthermore, the system as described does not inhibit existing ground-based fuel fill (or de-fuel) operations as implemented through existing practices.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of fuel distribution in an aircraft comprising:
    selecting a desired longitudinal center of gravity of an aircraft;
    determining a predicted rate of change of the center of gravity location during flight operation of the aircraft;
    disposing a volume of fuel in a tail fin tank of a vertical tail fin of the aircraft;
    transferring the fuel from the tail fin tank forward along a longitudinal axis of the aircraft at a predetermined transfer rate to counteract the predicted rate of change of the center of gravity location thereby maintaining the center of gravity in the selected position;
    opening a fuel shut off valve fluidly connected to the tail fin tank and one or more tail plane tanks disposed at horizontal tail planes of the aircraft;
    transferring fuel from the one or more tail plane tanks to the tail fin tank;
    closing the fuel shut off valve; and
    transferring the fuel from the tail fin tank forward along the longitudinal axis at the predetermined rate.

2. The method of claim 1, further comprising transferring the fuel forward along the aircraft's longitudinal axis to a center main fuel tank of the aircraft.

3. The method of claim 2, further comprising pumping the fuel from the center main fuel tank to one or more engines of the aircraft.

4. The method of claim 1, wherein the predetermined transfer rate is based on an anticipated fuel consumption rate of the aircraft's engines.

5. The method of claim 4, wherein the anticipated fuel consumption rate is determined by sensors in an aircraft fuel quantity indication system.

6. The method of claim 4, wherein the anticipated fuel consumption rate is a predetermined fuel consumption rate based on the mapped flight course.

7. An internal fuel distribution system for an aircraft, comprising:
   a center main fuel tank disposed at a fuselage of an aircraft;
   a tail fin fuel tank disposed at a vertical tail fin of the aircraft;
   a tail fin fuel pump to pump fuel between the tail fin fuel tank and the center main fuel tank along a longitudinal axis of the aircraft;
   a controller operably connected to the tail fin fuel pump to control operation of the tail fin fuel pump such that fuel is flowed between the tail fin fuel tank and the center main fuel tank at a predetermined transfer rate to maintain a selected position of a longitudinal center of gravity of the aircraft, based on a predicted rate of change of the longitudinal center of gravity of the aircraft during flight operations of the aircraft;
   two or more tail plane fuel tanks disposed at one of more horizontal tail planes of the aircraft in selective fluid communication with the tail fin fuel tank for fuel transfer between the two or more tail plane fuel tanks and the tail fin fuel tank, wherein the two or more tail plane fuel tanks and the tail fin fuel tank are configured for transfer of fuel from the two or more tail plane fuel tanks to the tail fin fuel tank prior to transfer of the fuel from the tail fin fuel tank to the center main fuel tank; and
   a fuel shutoff valve disposed between the tail fin fuel tank and the two or more tail plane fuel tanks to control the flow of fuel from the two or more tail plane fuel tanks to the tail fin fuel tank.

8. The system of claim 7, further comprising a three-way valve operably connecting the two or more tail plane fuel tanks and the tail fin fuel tank to control fuel flow between the tail plane fuel tanks and the tail fin fuel tank.

9. The system of claim 7, further comprising a tail plane fuel pump disposed at a tail plane fuel tank to pump fuel flow between the tail plane fuel tank and the tail fin fuel tank.

10. The system of claim 7, wherein the tail fin fuel pump is configured to pump fuel forward along the longitudinal axis of the aircraft from the tail fin fuel tank to the center main fuel tank.

11. The system of claim 7, wherein the predetermined transfer rate is based on an anticipated fuel consumption rate of the aircraft's engines.

12. The system of claim 11, wherein the anticipated fuel consumption rate is determined by sensors in an aircraft fuel quantity indication system.

13. The system of claim 11, wherein the anticipated fuel consumption rate is a predetermined fuel consumption rate based on the mapped flight course.

14. An aircraft comprising:
   a fuselage extending along a longitudinal axis of the aircraft;
   two wings extending laterally from the fuselage;
   a tail fin extending substantially vertically from a tail portion of the fuselage;
   one or more engines operably connected to the aircraft to provide thrust for the aircraft; and
   a fuel distribution system to provide fuel to the one or more engines including:
      a center main fuel tank disposed at the fuselage;
      a tail fin fuel tank disposed at the tail fin;
      a tail fin fuel pump to pump fuel between the tail fin fuel tank and the center main fuel tank along the longitudinal axis of the aircraft;
      a controller operably connected to the tail fin fuel pump to control operation of the tail fin fuel pump such that fuel is flowed between the tail fin fuel tank and the center main fuel tank at a predetermined transfer rate to maintain a selected position of a longitudinal center of gravity of the aircraft, based on a predicted rate of change of the longitudinal center of gravity of the aircraft during flight operations of the aircraft;
      two or more tail plane fuel tanks disposed at one of more horizontal tail planes of the aircraft in selective fluid communication with the tail fin fuel tank for fuel transfer between the two or more tail plane fuel tanks and the tail fin fuel tank, wherein the two or more tail plane fuel tanks and the tail fin fuel tank are configured for transfer of fuel from the two or more tail plane fuel tanks to the tail fin fuel tank prior to transfer of the fuel from the tail fin fuel tank to the center main fuel tank; and
      a fuel shutoff valve disposed between the tail fin fuel tank and the two or more tail plane fuel tanks to control the flow of fuel from the two or more tail plane fuel tanks to the tail fin fuel tank.

15. The aircraft of claim 14, further comprising a three-way valve operably connecting the two or more tail plane fuel tanks and the tail fin fuel tank to control fuel flow between the tail plane fuel tanks and the tail fin fuel tank.

16. The aircraft of claim 14, further comprising a tail plane fuel pump disposed at a tail plane fuel tank to pump fuel flow between the tail plane fuel tank and the tail fin fuel tank.

* * * * *